United States Patent [19]

Swanson

[11] Patent Number: 4,733,741

[45] Date of Patent: Mar. 29, 1988

[54] WEAR PLATE FOR A MOTORCYCLE

[76] Inventor: Daniel L. Swanson, 7415 Edgebrook Dr., St. Louis Park, Minn. 55426

[21] Appl. No.: 902,573

[22] Filed: Sep. 2, 1986

[51] Int. Cl.$^4$ ............................................ B62K 11/02
[52] U.S. Cl. ................................ 180/219; 280/289 G; 474/144
[58] Field of Search ............... 280/289 G, 289 R, 261; 180/219, 221, 230, 231; 474/144, 92, 111, 140, 152; 74/6

[56] References Cited

U.S. PATENT DOCUMENTS

| | | | |
|---|---|---|---|
| 655,316 | 8/1900 | Welch | 474/144 X |
| 3,148,555 | 9/1964 | Peras | 474/111 |
| 3,227,236 | 1/1966 | Burton | 180/230 |
| 3,673,884 | 7/1972 | Southiere | 474/111 X |
| 3,724,582 | 4/1973 | Wood | 180/219 |
| 3,838,606 | 10/1974 | Scalise | 474/144 |

FOREIGN PATENT DOCUMENTS

| | | | |
|---|---|---|---|
| 79436 | 6/1955 | Denmark | 280/289 G |
| 2557109 | 7/1976 | Fed. Rep. of Germany | 474/111 |
| 542514 | 8/1922 | France | 180/219 |
| 2382369 | 11/1978 | France | 280/289 G |
| 989582 | 4/1965 | United Kingdom | 474/111 |

Primary Examiner—John J. Love
Assistant Examiner—Charles R. Watts
Attorney, Agent, or Firm—Leo Gregory

[57] ABSTRACT

An arcuate wear plate mounted underlying the starter motor housing of a motorcycle protecting the same from engagement by an adjacent drive chain.

2 Claims, 3 Drawing Figures

WEAR PLATE FOR A MOTORCYCLE

BACKGROUND OF THE INVENTION

1. Field of Invention

This invention relates to wear caused by the drive chain of a motorcycle.

2. Brief Description of the Prior Art

In the operation of a motorcycle, the drive chain in passing over a pair of sprockets is frequently in a slack condition and in such condition engages or slaps against adjacent structural elements carried by the frame of the cycle. It is desirable to provide means to prevent the sprocket chain from causing wear and particularly the wear of an adjacent starter motor housing.

Various means have been employed to prevent a motorcycle drive chain from causing wear of other parts. In U.S. Pat. No. 3,724,582 to Wood, a chain guide is provided disposed about the chain. In U.S. Pat. No. 3,838,606 to Scalise, apparatus is provided to keep the drive chain in a taut condition to prevent engagement with adjacent surface areas. In U.S. Pat. No. 3,337,236 to Burton, a shroud is provided covering a sprocket and the chain thereabouts.

In U.S. Pat. No. 4,395,250 to King, a chain tensioning device is provided to prevent the chain from becoming slack as the slack portion of the chain engages and causes wear of adjacent parts.

It is desirable to have a simpler, more easily installed device to prevent chain wear than is present in the prior motorcycle art.

SUMMARY OF THE INVENTION

This invention relates to a very simple easily mounted member to prevent wear being caused by a drive chain of a motorcycle.

The drive chain of a motorcycle is closely adjacent the starter motor housing in passing over the drive motor sprocket to the driving wheel sprocket. This is particularly the case in a Harley Davidson Motorcycle. As a result the starter motor housing is subjected to considerable wear and requires frequent replacement.

It is an object of this invention to utilize the starter motor housing of a motorcycle for mounting a wear plate thereon to bear against the upper run of the adjacent sprocket chain passing from the driving motor sprocket to the driving wheel sprocket.

More particularly it is an object of this invention to provide a wear plate having an apertured ear angled to receive therethrough a bolt securing the starter motor housing and being secured by said bolt in operating position.

These and other objects and advantages of the invention will be set forth in the following description made in connection with the accompanying drawings in which like reference characters refer to similar parts throughout the several views.

DESCRIPTION OF A PREFERRED EMBODIMENT

Figure 1:
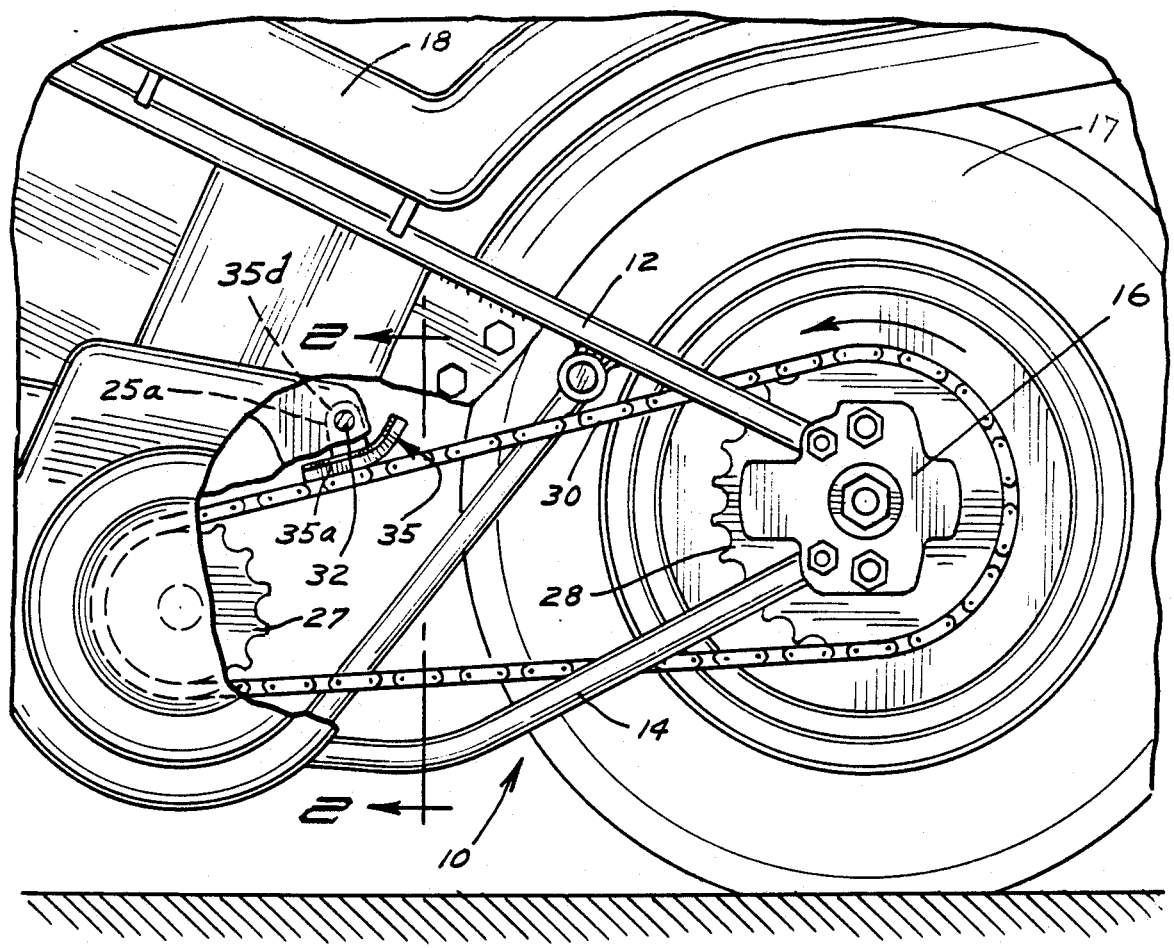
FIG. 1 is a view in side elevation of a portion of a motorcycle with a portion broken away showing the invention herein in operating position.

Referring to the drawings, a broken view in side elevation is shown of a motorcycle 10 of which sufficient thereof is shown for a full disclosure of the invention herein.

This invention is applicable to various models of motorcycles. For the purpose of illustration herein, reference is had to models 74–80 of a Harley Davidson Motorcycle.

A pair of diverging tubular frame members 12 and 14 extend forwardly from the rear wheel axle structure 16 of the driving wheel 17.

Supported by said frame member 12 is a seat 18 and carried by said frame below said seat is a motor housing indicated at 20. Mounted along said motor and shown in FIG. 1, is a starter motor housing 25.

Said starter motor housing and said driving wheel 17 respectively have mounted thereon sprockets 27 and 28 over which passes a sprocket or drive chain 30.

Figures 2, 3:
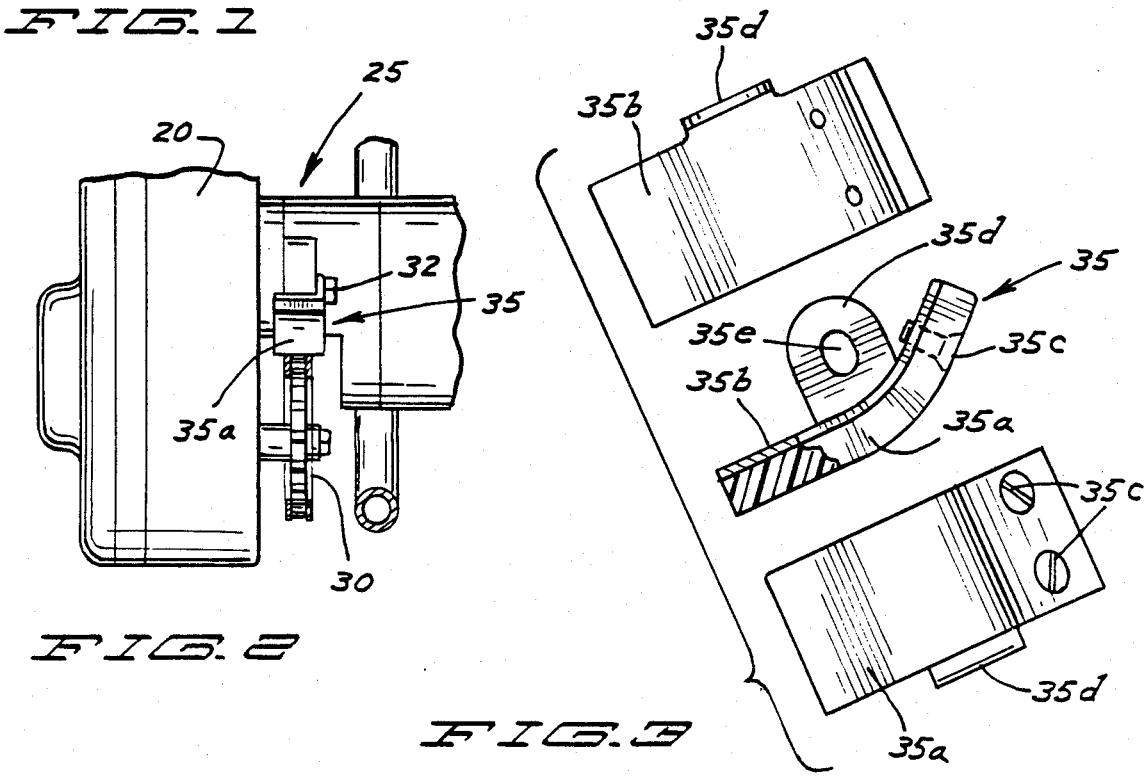
FIG. 2 is a view in vertical section taken on line 2—2 of FIG. 1 as indicated.
FIG. 3 is a composite view showing the invention herein respectively in rear elevation, side elevation and front elevation.

As indicated in FIG. 2, the chain 30 passes in close proximity to a projecting portion 25a of the starter motor housing 25 which is secured to the motor housing 20 by a bolt 32.

The drive chain in its normal operation depending upon the speed or change of speed of travel, from time to time develops a slackness and the slack portion of the chain slaps against adjacent structure. The chain passes sufficiently close to said projecting portion 25a of said starter motor housing that wear occurs and significant wear develops so frequently as to require replacement of the starter motor housing.

The subject matter of this invention is a wear plate member 35 as shown in FIG. 3 being substantially arcuate in longitudinal section, preferably formed having an outer layer 35a of a tough wear resistant material such as of an appropriate plastic material and having a sound deadening under layer 35b of a suitable rubber material. Said layers are bonded and are further secured together by bolts 35c.

Integral with said plate member and extending at right angles thereto is an ear 35d having a hole 35e therethrough.

With reference to FIGS. 1 and 2, it is seen that said plate member conforms to the underside of said projecting portion 25a of said starter motor housing 25 and the ear 35d is of a length to extend upwardly of said bolt 32 whereby said bolt is passed through said hole 35e to secure said plate member to said starter housing. The wear plate member overlies the path of travel of the upper run of said drive chain 30. Thus said plate member protects the starter motor housing from engagement by said chain 30.

When the motorcycle is driven at a fairly good rate of speed, the chain is in a right condition and there is clearance between the chain and said wear plate member. When speed is slackened, slack develops in the chain and the chain then tends to engage the wear plate and but for the presence of the wear plate, said chain would engage and wear upon said starter motor housing.

The installation of the wear plate is very easy to accomplish requiring only the withdrawal and re-insertion of the bolt 32 which is readily accessible.

It will of course be understood that various changes may be made in the form, details, arrangement and proportions of the product without departing from the scope of the invention which, generally stated, consists in a product capable of carrying out the objects above set forth, such as disclosed and defined in the appended claims.

What is claimed is:

1. In combination with a motorcycle motor housing and a drive chain, a device to protect the motor housing from wear by the chain, comprising a plate member upwardly bent at its longitudinally rearward end, and a wear resistant member attached along the bottom of said plate member, an ear upstanding from a side edge portion of said plate member, means for mounting said ear to the motor housing such that said wear resistant member is positioned above said chain and below said motor housing so that said wear resistant member prevents upward movement of a portion of said chain to protect the motor housing without thereby tensioning said chain.

2. The structure of claim 1, wherein said means consists of a mounting bolt of the motorcycle housing, and said ear is apertured to receive said bolt and be secured thereby.

* * * * *